US008912260B2

(12) United States Patent
Pusel et al.

(10) Patent No.: US 8,912,260 B2
(45) Date of Patent: Dec. 16, 2014

(54) LIQUID FILM BASED ON SILANE-TERMINATED POLYMERS

(75) Inventors: Thomas Pusel, Möglingen (DE); Raphael Teysseire, Visp (CH); Willi Tenisch, Kriens (CH); Susanne Strauss, Stuttgart (DE); Barbara Jucker, Zürich (CH); Carsten Zilg, Korntal-Münchigen (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/164,344

(22) Filed: Jun. 20, 2011

(65) Prior Publication Data

US 2011/0294931 A1    Dec. 1, 2011

Related U.S. Application Data

(63) Continuation of application No. PCT/EP2009/067547, filed on Dec. 18, 2009.

(30) Foreign Application Priority Data

Dec. 19, 2008 (EP) .................................... 08172420

(51) Int. Cl.
*C08K 5/523* (2006.01)
*C08G 18/48* (2006.01)
*C09D 175/04* (2006.01)
*C08G 18/10* (2006.01)
*C08K 3/22* (2006.01)
*C08K 5/52* (2006.01)

(52) U.S. Cl.
CPC ................ C09D 175/04 (2013.01); C08K 3/22 (2013.01); C08G 18/4866 (2013.01); C08K 5/52 (2013.01); C08G 18/10 (2013.01)
USPC ........... 524/127; 524/140; 524/141; 524/436; 524/437

(58) Field of Classification Search
USPC .................. 524/117, 140, 141, 436, 437, 127
See application file for complete search history.

(56) References Cited

U.S. PATENT DOCUMENTS

| 4,446,279 | A | * | 5/1984 | Keogh ........................... 525/106 |
| 6,440,541 | B1 | * | 8/2002 | Humphrey et al. ............ 428/209 |
| 6,790,906 | B2 | * | 9/2004 | Chaignon et al. .............. 524/706 |
| 2004/0181007 | A1 | * | 9/2004 | Acevedo et al. ............... 524/589 |
| 2005/0009956 | A1 |   | 1/2005 | Kimura |
| 2005/0215701 | A1 | * | 9/2005 | Porsch et al. .................. 524/589 |
| 2005/0261412 | A1 | * | 11/2005 | Bandou et al. ................. 524/442 |
| 2009/0227710 | A1 | * | 9/2009 | Porsch et al. .................... 524/35 |

FOREIGN PATENT DOCUMENTS

| CA | 2 197 598 | C |   | 8/2007 |
| EP | 0 791 613 | A1 |   | 8/1997 |
| EP | 1 457 527 | A1 |   | 9/2004 |
| EP | 2 009 063 | A |   | 12/2008 |
| JP | 2001-323173 | A |   | 11/2001 |
| JP | 2002-038377 | A |   | 2/2002 |
| JP | 2004-155799 | A |   | 6/2004 |
| JP | 2004-161944 |   | * | 6/2004 |
| JP | 2004-161944 | A |   | 6/2004 |
| JP | 2005-029642 | A |   | 2/2005 |
| JP | 2007-051268 | A |   | 3/2007 |
| JP | 2007-168410 | A |   | 7/2007 |
| JP | 2010-132843 | A |   | 6/2010 |

OTHER PUBLICATIONS

International Search Report (PCT/ISA/210) issued on Feb. 18, 2010, by European Patent Office as the International Searching Authority for International Application No. PCT/EP2009/067547.
Written Opinion (PCT/ISA/237) issued on Feb. 18, 2010, by European Patent Office as the International Searching Authority for International Application No. PCT/EP2009/067547.
Notification of Transmittal of Translation of the International Preliminary Report on Patentability (Form PCT/IB/338), including International Preliminary Report on Patentability (Form PCT/IB/373),and English translation of the Written Opinion (Form PCT/ISA/237), dated Jun. 21, 2011, for International Application No. PCT/EP2009/067547.
Japanese Office Action (Notice of Reasons for Rejection) dated Jun. 18, 2013, issued by the Japanese Patent Office in corresponding Japanese Patent Application No. 2011-541483 and English language translation. (9 pages).

* cited by examiner

*Primary Examiner* — Peter Szekely
(74) *Attorney, Agent, or Firm* — Buchanan Ingersoll & Rooney PC

(57) ABSTRACT

A composition that includes at least one silane-functional polymer P and 20 to 60% by weight of aluminum hydroxide or magnesium hydroxide or mixture thereof, is disclosed. The composition has a viscosity of 500 to 20,000 mPa·s measured according to DIN 53018 at a temperature of 20° C. The composition is suitable as a liquid membrane and has very good flammability properties, i.e., it is difficult to ignite and is self-extinguishing.

32 Claims, No Drawings

LIQUID FILM BASED ON SILANE-TERMINATED POLYMERS

RELATED APPLICATIONS

This application claims priority as a continuation application under 35 U.S.C. §120 to PCT/EP2009/067547, which was filed as an International Application on Dec. 18, 2009 designating the U.S., and which claims priority to European Application No. 08172420.5 filed in Europe on Dec. 19, 2008. The entire contents of these applications are hereby incorporated by reference in their entireties.

FIELD

This disclosure relates to the field of films that can be applied in fluid form to form a structural seal.

BACKGROUND INFORMATION

Films that can be applied in fluid form for a structural seal based on polyurethanes or acrylate dispersions are known.

Compositions for liquid membranes based on polyurethane contain organic solvents and isocyanates and thus are not suitable for certain applications for ecological and toxicological reasons.

In addition, polyurethane-based liquid membranes can require an extensive substrate preparation to achieve sufficient adhesion. In this case, primarily adhesion promoter compositions, so-called primers, are used. For various reasons, it may be desirable or of considerable advantage to dispense with adhesion-promoting compositions in the application of a liquid membrane. Thus, for example, in addition to a cost advantage, the primer-less application of film also entails a time advantage, since the application and the aeration of the adhesion-promoting composition can be dispensed with. In addition, the primerless application of the film also has ecological advantages, since primers very often contain large amounts of volatile, organic solvents, so-called VOCs (Volatile Organic Compounds).

Polyurethane compositions can often have relatively short shelf lives and that they have to be modified for the application on vertical surfaces to prevent the composition from running off.

In contrast, compositions for liquid membranes based on acrylate dispersions are free of organic solvents and have a relatively long shelf life of up to 12 months. They are considerably less UV- and weather-resistant and can be applied on a limited number of substrates because of deficient adhesion.

In addition, known liquid membranes have disadvantages relative to their flammability properties, which can be problematic in the sealing of occupied buildings from the standpoint of safety.

SUMMARY

According to an exemplary aspect, a composition is disclosed, comprising:
a) at least one silane-functional polymer P; and
b) 20 to 60% by weight of aluminum hydroxide, magnesium hydroxide or a mixture thereof;
wherein the composition has a viscosity of 500 to 20,000 mPa·s that is measured according to DIN 53018 at a temperature of 20° C.

According to another exemplary aspect, a composition is disclosed further comprising at least one phosphorus compound of Formula (I)

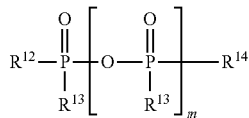

wherein either
the radical $R^{12}$ stands for a radical of Formula $-OR^{15}$;
the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;
the radical $R^{13}$ stands for a hydrogen atom or for a radical $R^{14}$;
the radical $R^{14}$ stands for a radical of Formula $-OR^{16}$;
the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and
the index m stands for a value of 0, 1 or 2;
or
each of radicals $R^{12}$, $R^{13}$ and $R^{14}$ stands for a radical of Formula $-O^-NH_4^+$;
and the index m stands for a value of 0 to 1,000.

According to another exemplary aspect, a composition is disclosed wherein the silane-functional polymer P has end groups of Formula (II)

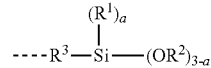

wherein
the radical $R^1$ stands for a linear or branched, monovalent hydrocarbon radical with 1 to 8 C atoms;
the radical $R^2$ stands for an acyl radical or for a linear or branched, monovalent hydrocarbon radical with 1 to 5 C atoms;
the radical $R^3$ stands for a linear or branched, divalent hydrocarbon radical with 1 to 12 C atoms, which optionally has cyclic and/or aromatic portions, and optionally one or more heteroatoms; and
a stands for a value of 0 or 1 or 2.

According to another exemplary aspect, a method of applying a film is disclosed, comprising applying a composition in fluid form to a substrate.

According to another exemplary aspect, a method for the production of a film for sealing a substrate is disclosed, the method comprising:
i) providing a composition according to claim 1;
ii) applying the composition in a fluid state to the substrate to be sealed;
iii) curing of the applied composition by means of moisture to form a film.

According to another exemplary aspect, a film formed from an exemplary method is disclosed.

DETAILED DESCRIPTION

Disclosed is an exemplary composition for the production of liquid membranes that can ameliorate or overcome disadvantages of related art, represents an improvement from an ecological and toxicological standpoint, and/or has improved properties in terms of flammability behavior.

By the combination of aluminum hydroxide and/or magnesium hydroxide with a silane-terminated polymer, compositions can be produced, for example, that can be applied as film in the fluid state and that have neither volatile organic solvents nor isocyanates and that show very good properties in terms of their flammability behavior, by which they increase the safety for buildings and users thereof.

Disclosed is a composition that comprises
a) at least one silane-functional polymer P; and
b) 20 to 60% by weight of aluminum hydroxide or magnesium hydroxide or mixture thereof;
wherein the composition has a viscosity of 500 to 20,000 mPa·s that is measured according to DIN 53018 at a temperature of 20° C.

In this document, substance names that begin with "poly," such as polyol or polyisocyanate, include substances that formally contain two or more functional groups, occurring in their name, per molecule.

In this document, the term "polymer" comprises, on the one hand, a collective of macromolecules that are chemically uniform but different relative to the degree of polymerization, molecular weight, and chain length, and said collective was produced by a polyreaction (polymerization, polyaddition, or polycondensation). On the other hand, the term also comprises derivatives of such a collective of macromolecules from polyreactions, i.e., compounds that were obtained by reactions, such as, for example, additions or substitutions, of functional groups on specified macromolecules, and that can be chemically uniform or chemically non-uniform. In addition, the term also comprises so-called prepolymers, i.e., reactive oligomeric prepolymers whose functional groups are involved in the creation of macromolecules.

The term "polyurethane polymer" comprises all polymers that are produced according to the so-called diisocyanate-polyaddition method. This also includes those polymers that are completely or almost free of urethane groups. Examples of polyurethane polymers are polyether-polyurethanes, polyester-polyurethanes, polyether-polyureas, polyureas, polyester-polyureas, polyisocyanurates and polycarbodiimides.

In this document, the terms "silane" and "organosilane" include compounds that have, on the one hand, at least one, usually two or three, alkoxy groups or acyloxy groups that are bonded directly to the silicon atom via Si—O bonds, and, on the other hand, at least one organic radical that is bonded directly to the silicon atom via an Si—C bond. Such silanes are also known to one skilled in the art as organoalkoxysilanes or organoacyloxysilanes.

Corresponding to this, the term "silane group" includes the silicon-containing group that is bonded to the organic radical of the silane that is bonded via the Si—C bond. The silanes, and their silane groups, have the property of hydrolyzing upon contact with moisture. In this case, organosilanols are formed, i.e., silicon-organic compounds that contain one or more silanol groups (Si—OH groups) and, by subsequent condensation reactions, organosiloxanes, i.e., silicon-organic compounds that contain one or more siloxane groups (Si—O—Si groups).

The term "silane-functional" includes compounds that have silane groups. Accordingly, "silane-functional polymers" include polymers that have at least one silane group.

Organosilanes, whose organic radical has an amino group or a mercapto group, are referred to as "aminosilanes" or "mercaptosilanes." Aminosilanes that have a primary amino group, i.e., an $NH_2$ group, which is bonded to an organic radical, are referred to as "primary aminosilanes." Aminosilanes that have a secondary amino group, i.e., an NH group, which is bonded to two organic radicals, are referred to as "secondary aminosilanes."

In this document, "molecular weight" is always defined as the number average molecular weight $M_n$.

An exemplary composition contains at least one silane-functional polymer P which for example, has end groups of Formula (II).

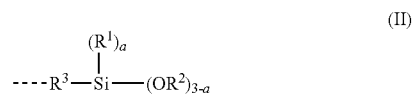

(II)

In this case, the radical $R^1$ stands for a linear or branched, monovalent hydrocarbon radical with 1 to 8 C atoms, for example, for a methyl group or for an ethyl group.

The radical $R^2$ stands for an acyl radical or for a linear or branched, monovalent hydrocarbon radical with 1 to 5 C atoms, for example, for a methyl group or for an ethyl group or for an isopropyl group.

The radical $R^3$ stands for a linear or branched, divalent hydrocarbon radical with 1 to 12 C atoms, which optionally has cyclic and/or aromatic portions, and optionally one or more heteroatoms, for example, one or more nitrogen atoms.

The index a stands for a value of 0 or 1 or 2, for example, for a value of 0.

Within a silane group of Formula (II), $R^1$ and $R^2$, in each case independently of one another, stand for the described radicals. Thus, for example, compounds with end groups of Formula (II), which are ethoxy-dimethoxysilane end groups ($R^2$=methyl, $R^2$=methyl, $R^2$=ethyl), are also possible.

In an exemplary embodiment, the silane-functional polymer P is a silane-functional polyurethane polymer P1, which can be obtained by the reaction of a silane, which has at least one group that is reactive to isocyanate groups, with a polyurethane polymer, which has isocyanate groups. This reaction can be performed in a stoichiometric ratio of 1:1 of the groups—which are reactive to isocyanate groups—to the isocyanate groups or with a slight excess of groups that are reactive to isocyanate groups, such that the resulting silane-functional polyurethane polymer P1 is completely free of isocyanate groups.

In the reaction of silane, which has at least one group that is reactive to isocyanate groups, with a polyurethane polymer, which has isocyanate groups, the silane can be used, for example, primarily used, under sub-stoichiometric conditions, such that a silane-functional polymer is obtained that has both silane groups and isocyanate groups.

The silane, which has at least one group that is reactive to isocyanate groups, is, for example, a mercaptosilane or an aminosilane, for example, an aminosilane.

The aminosilane can be an aminosilane AS of Formula (III),

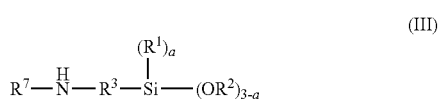

(III)

wherein $R^1$, $R^2$, $R^3$ and a had already been described above, and $R^7$ stands for a hydrogen atom or for a linear or branched, monovalent hydrocarbon radical with 1 to 20 C atoms, which optionally has cyclic portions, or $R^7$ stands for a radical of Formula (IV).

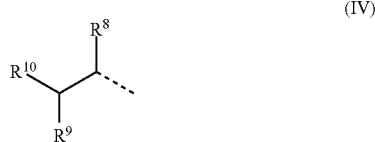

In this case, the radicals $R^8$ and $R^9$, in each case independently of one another, stand for a hydrogen atom or for a radical selected from $-R^{11}$, $-COOR^{11}$ and $-CN$.

The radical $R^{19}$ stands for a hydrogen atom or for a radical selected from $-CH_2-COOR^{11}$, $-COOR^{11}$, $-CONHR^{11}$, $-CON(R^{11})_2$, $-CN$, $-NO_2$, $-PO(OR^{11})_2$, $-SO_2R^{11}$ and $-SO_2OR^{11}$.

The radical $R^{11}$ stands for a hydrocarbon radical with 1 to 20 C atoms that optionally has at least one heteroatom.

Examples of suitable aminosilanes AS are primary aminosilanes such as 3-aminopropyltrimethoxysilane, 3-aminopropyldimethoxymethylsilane; secondary aminosilanes, such as N-butyl-3-aminopropyltrimethoxysilane, N-phenyl-3-aminopropyltrimethoxysilane; the products from the Michael addition of primary aminosilanes such as 3-aminopropyltrimethoxysilane or 3-aminopropyldimethoxymethylsilane on Michael acceptors such as acrylonitrile, acrylic and methacrylic acid esters, acrylic or methacrylic acid amides, maleic acid and fumaric acid diesters, citraconic acid diesters and itaconic acid diesters, for example N-(3-trimethoxysilyl-propyl)-amino-succinic acid dimethyl and diethyl esters; as well as analogs of the above-mentioned aminosilanes with ethoxy or isopropoxy groups instead of the methoxy groups on silicon. As aminosilanes AS, secondary aminosilanes, for example, aminosilanes AS, in which $R^7$ in Formula (III) is different from H, can be used. The Michael adducts, for example, N-(3-trimethoxysilyl-propyl)-amino-succinic acid diethyl ester, can be used.

In this document, the term "Michael acceptor" includes compounds that—because of the double bonds activated by electron-acceptor radicals that are contained therein—are capable of entering into a nucleophilic addition reaction in an analogous way to the Michael addition (Hetero-Michael addition) with primary amino groups ($NH_2$ groups).

As polyurethane polymers that have isocyanate groups for the production of a silane-functional polyurethane polymer P1, for example, polymers that can be obtained by the reaction of at least one polyol with at least one polyisocyanate, for example, a diisocyanate, can be used. This reaction can be carried out in that the polyol and the polyisocyanate can be reacted with exemplary methods, for example at temperatures of 50° C. to 100° C., optionally with the simultaneous use of suitable catalysts, whereby the polyisocyanate can be metered in such a way that its isocyanate groups are present in stoichiometric excess relative to the hydroxyl groups of the polyol.

For example, the excess polyisocyanate can be selected in such a way that in the resulting polyurethane polymer after the reaction of all hydroxyl groups of the polyol, a content of free isocyanate groups of 0.1 to 5% by weight, for example, 0.1 to 2.5% by weight, for example, 0.2 to 1% by weight, relative to the entire polymer, remains.

Optionally, the polyurethane polymer can be produced with the simultaneous use of softeners, whereby the softeners that are used, for example, do not contain any groups that are reactive to isocyanates.

Polyurethane polymers with the above-mentioned content of free isocyanate groups, which are obtained from the reaction of diisocyanates with high-molecular diols in an NCO:OH ratio of 1.5:1 to 2.2:1, can be used.

Suitable polyols for the production of the polyurethane polymer include, for example, polyether polyols, polyester polyols and polycarbonate polyols as well as mixtures of these polyols.

As polyether polyols, polyoxyalkylene polyols or oligoetherols are also mentioned, and, for example, those are suitable that are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as, for example, water, ammonia or compounds with several OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds. Both polyoxyalkylene polyols, which have a low degree of unsaturation (measured according to ASTM D-2849-69 and indicated in milliequivalents of unsaturation per gram of polyol (mEq/g)), produced, for example, using the so-called double metal cyanide complex catalysts (DMC catalysts), and polyoxyalkylene polyols with a higher degree of unsaturation, produced, for example, using anionic catalysts such as NaOH, KOH, CsOH or alkali alcoholates, can be used.

Polyoxyethylene polyols and polyoxypropylene polyols, for example, polyoxyethylene diols, polyoxypropylene diols, polyoxyethylene triols and polyoxypropylenetriols, can be used.

For example, polyoxyalkylene diols or polyoxyalkylene triols with a degree of unsaturation that is lower than 0.02 mEq/g and with a molecular weight in the range of 1,000 to 30,000 g/mol, as well as polyoxyethylene diols, polyoxyethylene triols, polyoxypropylene diols and polyoxypropylene triols with a molecular weight of 400 to 20,000 g/mol can be used.

Also especially suitable are the so-called ethylene oxide-terminated ("EO-end-capped," ethylene oxide-end-capped) polyoxypropylene polyols. The latter are special polyoxypropylene polyoxyethylene polyols, which are obtained, for example, in that pure polyoxypropylene polyols, for example, polyoxypropylene diols and -triols, are further alkoxylated with ethylene oxide after the polypropoxylating reaction is concluded and as a result have primary hydroxyl groups. In this case, polyoxypropylene polyoxyethylene diols and polyoxypropylene polyoxyethylene triols can be used.

In addition, hydroxyl-group-terminated polybutadiene polyols, such as, for example, those that are produced by polymerization of 1,3-butadiene and allyl alcohol or by oxidation of polybutadiene, as well as their hydrogenation products, can be used.

Also suitable are styrene-acrylonitrile-grafted polyether polyols, as are commercially available from the company Elastogran GmbH, Germany, for example under the trade name Lupranol®.

As polyester polyols, for example, polyesters are suitable that carry at least two hydroxyl groups and are produced according to known methods, for example, the polycondensation of hydroxycarboxylic acids or the polycondensation of aliphatic and/or aromatic polycarboxylic acids with divalent or multivalent alcohols.

Polyester polyols can be used that are produced from divalent to trivalent alcohols, such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylol propane or mixtures of the above-mentioned alcohols with organic dicarboxylic acids or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride or mixtures of the above-mentioned acids, as well as polyester polyols from lactones, such as, for example, ε-caprolactone.

Polyester diols can be used, for example, those that are produced from adipic acid, azelaic acid, sebacic acid, dodecanedicarboxylic acid, dimer fatty acid, phthalic acid, isophthalic acid, and terephthalic acid as dicarboxylic acid or from lactones, such as, for example, ε-caprolactone and from ethylene glycol, diethylene glycol, neopentyl glycol, 1,4-butanediol, 1,6-hexanediol, dimer fatty acid diol and 1,4-cyclohexane dimethanol as divalent alcohol.

Polycarbonate polyols that can be used include those that are available by reaction of, for example, the above-mentioned alcohols, which are used to create the polyester polyols, with dialkyl carbonates such as dimethyl carbonate, diaryl carbonates such as diphenyl carbonate or phosgene. Polycarbonate diols, for example, amorphous polycarbonate diols, can be used.

Other suitable polyols include poly(meth)acrylate polyols.

In addition, polyhydroxy-functional fats and oils, for example natural fats and oils, for example, castor oil or the so-called oleochemical polyols that are obtained by chemical modification of natural fats and oils, the epoxy polyesters or epoxy polyethers that are obtained by, for example, epoxidation of unsaturated oils and subsequent ring opening with carboxylic acids or alcohols, or polyols that are obtained by hydroformylation and hydrogenation of unsaturated oils can be used. In addition, polyols can be used that are obtained from natural fats and oils by creation processes such as alcoholysis or ozonolysis and subsequent chemical linkage, for example by reesterification or dimerization, of the thus obtained degradation products or derivatives thereof. Suitable degradation products of natural fats and oils are, for example, fatty acids and fatty alcohols as well as fatty acid esters, for example, the methyl esters (FAME) that can be derivatized by, for example, hydroformylation and hydrogenation to form hydroxy fatty acid esters.

In addition, polyhydrocarbon polyols, also called oligohydrocarbonols, for example, polyhydroxy-functional ethylene-propylene, ethylene-butylene or ethylene-propylene-diene copolymers, as they are produced by, for example, the company Kraton Polymers, USA, or polyhydroxy-functional copolymers that include dienes such as 1,3-butanediene or diene mixtures, and vinyl monomers such as styrene, acrylonitrile or isobutylene, or polyhydroxy-functional polybutadiene polyols, for example, those that are produced and can also be hydrogenated by co-polymerization of 1,3-butadiene and allyl alcohol, can be used.

In addition, polyhydroxy-functional acrylonitrile/butadiene copolymers, as can be produced, for example, from epoxides or amino alcohols and carboxyl-terminated acrylonitrile/butadiene copolymers, which are commercially available under the name Hypro® (earlier Hycar®) CTBN from the company Emerald Performance Materials, LLC, USA, can be used.

These above-mentioned polyols can have a mean molecular weight of 250 to 30,000 g/mol, for example, 1,000 to 30,000 g/mol, and a mean OH functionality in the range of 1.6 to 3.

Especially suitable polyols are polyester polyols and polyether polyols, for example, polyoxyethylene polyol, polyoxypropylene polyol and polyoxypropylene polyoxyethylene polyol, for example, polyoxyethylene diol, polyoxypropylene diol, polyoxyethylene triol, polyoxypropylene triol, polyoxypropylene polyoxyethylene diol and polyoxypropylene polyoxyethylene triol.

In addition to these above-mentioned polyols, small amounts of low-molecular divalent or multivalent alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols such as xylitol, sorbitol or mannitol, sugars such as saccharose, other polyhydric alcohols, low-molecular alkoxylation products of the above-mentioned divalent and multivalent alcohols, as well as mixtures of the above-mentioned alcohols in the production of the polyurethane polymer that has terminal isocyanate groups, can be used simultaneously.

As polyisocyanates for the production of the polyurethane polymer, commercially available, aliphatic, cycloaliphatic or aromatic polyisocyanates, for example, diisocyanates, can be used.

For example, the diisocyanate, whose isocyanate groups are bonded in each case to an aliphatic, cycloaliphatic or arylaliphatic C atom, are also called "aliphatic diisocyanates," such as 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane-1,3-diisocyanate, cyclohexane-1,4-diisocyanate, 1-isocyanato-3,3,5-trimethyl-5-isocyanatomethyl-cyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-isocyanato-1-methylethyl)-naphthalene; as well as diisocyanates with isocyanate groups that are bonded in each case to an aromatic C atom, also called "aromatic diisocyanates," such as 2,4- and 2,6-toluoylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD; oligomers and polymers of the above-mentioned isocyanates, as well as any mixtures of the above-mentioned isocyanates.

For example, suitable silane-functional polymers P1 are commercially available under the trade name Polymer ST, for example Polymer ST50, from the company Hanse Chemie AG, Germany, as well as under the trade name Desmoseal® from the company Bayer MaterialScience AG, Germany.

The silane-functional polymer P is a silane-functional polyurethane polymer P2 in a second embodiment, available by the reaction of an isocyanatosilane IS with a polymer, which has functional end groups, for example, hydroxyl groups, mercapto groups and/or amino groups, which are reactive to isocyanate groups. This reaction is carried out in the stoichiometric ratio of the isocyanate groups to the functional end groups that are reactive to isocyanate groups of 1:1, or with slight excess of the functional end groups that are reactive to isocyanate groups, for example at temperatures of 20° C. to 100° C., optionally with simultaneous use of catalysts.

As isocyanatosilane IS, compounds of Formula (V) can be used.

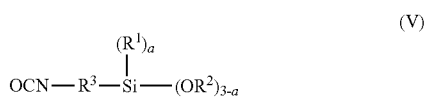

whereby $R^1$, $R^2$, $R^3$ and a were already described above.

Examples of suitable isocyanatosilanes IS of Formula (V) include isocyanatomethyltrimethoxysilane, isocyanatomethyldimethoxymethylsilane, 3-isocyanatopropyltrimethoxysilane, 3-isocyanatopropyldimethoxymethylsilane, and their analogs with ethoxy or isopropoxy groups instead on methoxy groups on silicon.

The polymer can have hydroxyl groups as functional end groups that are reactive to isocyanate groups.

As polymers that have hydroxyl groups, on the one hand, already mentioned high-molecular polyoxyalkylene polyols, for example, polyoxypropylene diols with a degree of unsaturation that is lower than 0.02 mEq/g and with a molecular weight in the range of 4,000 to 30,000 g/mol, for example, those with a molecular weight in the range of 8,000 to 30,000 g/mol, can be used.

On the other hand, polyurethane polymers that have hydroxyl groups, for example, terminated hydroxyl groups, are also suitable for reaction with isocyanatosilanes IS of Formula (V). Such polyurethane polymers are available through the reaction of at least one polyisocyanate with at least one polyol. This reaction can be carried out in that the polyol and the polyisocyanate are reacted with the usual methods, for example at temperatures of 50° C. to 100° C., optionally with simultaneous use of suitable catalysts, whereby the polyol is metered in such a way that its hydroxyl groups are present in stoichiometric excess relative to the isocyanate groups of the polyisocyanate. A ratio of hydroxyl groups to isocyanate groups of 1.3:1 to 4:1 can be used, for example, 1.8:1 to 3:1.

Optionally, the polyurethane polymer can be produced with simultaneous use of softeners, whereby the softeners that are used do not contain any groups that are reactive to isocyanates.

For this reaction, the same polyols and polyisocyanates that were already mentioned as suitable for the production of a polyurethane polymer that has isocyanate groups, which polymer is used for the production of a silane-functional polyurethane polymer P1, can be used.

For example, suitable silane-functional polymers P2 are commercially available under the trade names SPUR+® 1010LM, 1015LM and 1050MM from the company Momentive Performance Materials Inc., USA, as well as under the trade names Geniosil® STP-E15, STP-10 and STP-E35 from the company Wacker Chemie AG, Germany.

In a third embodiment, the silane-functional polymer P is a silane-functional polymer P3, which is available through a hydrosilylation reaction of polymers, with terminal double bonds, for example poly(meth)acrylate polymers or polyether polymers, for example, allyl-terminated polyoxyalkylene polymers, described in, for example, U.S. Pat. No. 3,971,751 and U.S. Pat. No. 6,207,766, the contents of which are incorporated herein by reference.

For example, suitable silane-functional polymers P3 are commercially available under the trade names MS-Polymer® S203(H), S303(H), S227, S810, MA903 and S943, Silyl® SAX220, SAX350, SAX400 and SAX725, Silyl® SAT350 and SAT400, as well as XMAP® SA100S and SA310S from the company Kaneka Corp., Japan, as well as under the trade names Excestar® S2410, S2420, S3430, S3630, W2450 and MSX931 from the company Asahi Glass Co, Ltd., Japan.

The silane-functional polymer P can include a silane-functional polymer P1 or P2. The latter have the advantage relative to the silane-functional polymer P3 in that they are simpler and thus more economical in production.

Usually, the silane-functional polymer P is present in an amount of 10 to 80% by weight, for example, in an amount of 15 to 70% by weight, for example, 20 to 40% by weight, relative to the entire composition.

In addition, an exemplary composition comprises 20 to 60% by weight, for example, 30 to 55% by weight, for example, 40 to 50% by weight of aluminum hydroxide or magnesium hydroxide or mixture thereof. An exemplary composition can comprise aluminum hydroxide.

The aluminum hydroxide and/or the magnesium hydroxide are, for example, in powder form, wherein powders with grain sizes of 0.1 to 100 μm can be used.

In addition to the aluminum hydroxide and/or magnesium hydroxide, an exemplary composition in addition can contain additional fillers, which influence both the rheological properties of the non-cured composition and the mechanical properties and the surface conditions of the cured composition. Suitable additional fillers are inorganic and organic fillers, for example natural, ground, or precipitated calcium carbonates, which optionally are coated with fatty acids, for example, stearic acid, barium sulfate ($BaSO_4$, also called barite or heavy spar), calcined kaolins, silicic acids, for example, highly dispersed silicic acids from pyrolysis processes, PVC powders or hollow spheres. An exemplary composition can contain coated calcium carbonates as other fillers.

A suitable amount of additional filler lies, for example, in the range of 1 to 15% by weight, for example, 2 to 10% by weight, for example, 3 to 8% by weight, relative to the entire composition.

In addition, the composition can contain a phosphorus compound of Formula (I)

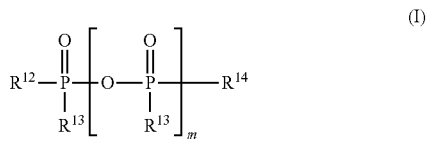

wherein either
  the radical $R^{12}$ stands for a radical of Formula —$OR^{15}$;
  the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;

the radical $R^{13}$ stands for a hydrogen atom or for a radical $R^{14}$;

the radical $R^{14}$ stands for a radical of Formula —$OR^{16}$;

the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and the index m stands for a value of 0, 1 or 2;

or wherein all radicals $R^{12}$, $R^{13}$ and $R^{14}$ stand for radicals of Formula —$O^-NH_4^+$; and the index m stands for a value of 0 to 1,000, for example, 100 to 1,000.

In an exemplary composition, the phosphorus compound of Formula (I) can have both softening and flame-retardant properties. As flame-retardant compounds, the phosphorus compounds of Formula (I) can have the advantage that in the event of fire, they form a protective layer by carbonizing on the surface.

The phosphorus compounds of Formula (I), in which all radicals $R^{12}$, $R^{13}$ and $R^{14}$ stand for the radicals of Formula —$O^-NH_4^+$, in addition can have the advantage that in the event of fire, they can split off ammonia, which displaces oxygen in the gaseous state.

Suitable phosphorus compounds of Formula (I) can be selected, for example, from the group that include triethyl phosphate, tricresyl phosphate, triphenyl phosphate, diphenyl cresyl phosphate, isodecyl diphenyl phosphate, tris(1,3-dichloro-2-propyl)phosphate, tris(2-chloroethyl)phosphate, tris(2-ethylhexyl)phosphate, tris(chloroisopropyl)phosphate, tris(chloropropyl)phosphate, isopropylated triphenyl phosphate, mono-, bis- and tris(isopropyl-phenyl)phosphates of a varying degree of isopropylation, resorcinol-bis(diphenylphosphate), bisphenol-A-bis(diphenylphosphate) and ammonium polyphosphates.

In the phosphorus compound of Formula (I), the radicals $R^{12}$, $R^{13}$ and $R^{14}$ in each case can stand for linear or branched, monovalent hydrocarbon radicals with 1 to 18, for example, with 4 to 16, for example, with 6 to 12, C atoms, and m can stand for a value of 0. Such phosphorus compounds of Formula (I) do not have any halogenated organic groups relative to other usual flame retardant agents and thus can be advantageous from the ecological and toxicological standpoint.

For example, phosphorus compounds of Formula (I), commercially available under the trade names Disflamoll® DPK, Disflamoll® TOF, Levagard® TEP, Disflamoll® TKP, Disflamoll® TP from the company Lanxess AG, Germany, under the trade name Santicizer® 148 from the company Ferro Corporation, USA, or under the trade name Antiblaze® PI from the company Albemarle Corporation, USA, can be used.

The proportion of phosphorus compound of Formula (I) van be 5 to 50% by weight, for example, 5 to 30% by weight, for example, 7 to 15% by weight of the entire composition.

In addition, an exemplary composition can contain at least one organosilane, whose organic radical has at least one functional group. As a functional group, for example, at least one epoxy, (meth)acrylate ester, amine, mercapto, anhydride, urea or vinyl group can be used. In addition, adducts of the above-mentioned silanes with primary aminosilanes can be used.

For example, such organosilanes can be aminosilanes, as they had been described above as aminosilanes AS of Formula (III), mercaptosilanes such as 3-mercaptopropyltrimethoxysilane, epoxysilanes such as 3-glycidoxy-propyltrimethoxysilane or the like.

The organosilane whose organic radical has at least one functional group, an amino-functional organosilane, also called aminosilane, can be used. Aminosilanes can be used which are primarily described as aminosilanes AS of Formula (III).

The proportion of organosilane, whose organic radical has at least one functional group, can be 0.5 to 15% by weight, for example, 1 to 10% by weight, for example, 2 to 5% by weight of the entire composition.

Such organosilanes, as they are described here, can be used for various purposes in exemplary compositions. For example, organosilanes can act as reactive diluents, which are bonded into the polymer matrix in the curing of the composition, for example, by reaction with the silane groups. In addition, they can be used as chain stoppers in cross-linking or as desiccants.

Furthermore, the use of such compounds can lead to an improvement in the adhesion of an exemplary composition to a number of substrates, by which the organosilanes also have the function as adhesion promoters.

In addition, an exemplary composition can comprise at least one catalyst for the cross-linking of silane-functional polymer P. Suitable catalysts can include, for example, metal catalysts in the form of organotin compounds, such as dibutyltin dilaurate and dibutyltin diacetyl acetonate, bismuth-organic compounds or bismuth complexes, titanium catalysts and amino-group-containing compounds, for example 1,4-diazabicyclo[2.2.2]octane and 2,2'-dimorpholinodiethylether, as well as mixtures of the above-mentioned catalysts.

The proportion of catalyst can be 0.001 to 5% by weight, for example, 0.01 to 3% by weight, for example, 0.01 to <0.5% by weight, for example, 0.01 to 0.1% by weight of the entire composition.

In this case, the amount of catalyst that is used can be dependent on the silane-functional polymer P that is used. Silane-functional polymer P is a silane-functional polymer P1 or P2; thus, a smaller amount of catalyst can be used than when the silane-functional polymer P is a silane-functional polymer P3. A smaller amount of catalyst can have, for example, toxicological advantages.

In addition, an exemplary composition can contain other components as well. For example, such components are additional softeners such as esters of organic carboxylic acids or their anhydrides, such as phthalates, for example dioctyl phthalate, diisononyl phthalate, or diisodecyl phthalate, adipates, for example, dioctyl adipate, azelates and sebacates; polyols, for example, polyoxyalkylene polyols or polyester polyonitrogen; organic phosphorus and sulfonic acid esters or polybutenes; solvents; fibers, for example glass fibers, carbon fibers, metal fibers, ceramic fibers, or plastic fibers, such as polyamide fibers or polyethylene fibers; dyes; pigments; rheology-modifiers such as thickening agents or thixotropic agents, for example urea compounds of the type described as thixotropic agents ("thixotropy-endowing agent") in WO 02/48228 A2 on pages 9 to 11; polyamide wax, bentonite or pyrogenic silicic acids; cross-linking agents, for example silane-functional oligomers and polymers; additional desiccants, for example, α-functional silanes such as N-(silylmethyl)-O-methyl-carbamates, for example, N-(methyldimethoxysilylmethyl)-O-methyl-carbamate, (methacryloxymethyl)silanes, methoxymethylsilanes, N-phenyl-, N-cyclohexyl- and N-alkylsilanes, orthoformic acid esters, calcium oxide or molecular sieves; stabilizers, for example to protect against heat, light, and UV radiation; surfactants such as wetting agents, flow enhancers, ventilating agents, or foam inhibitors; biocides such as algicides, fungicides, or the substances that inhibit fungal growth; as well as other substances that are usually used in moisture-curing compositions.

For example, it can be advantageous to select all above-mentioned components that are optionally present in the composition in such a way that the shelf life of the composition is not negatively influenced by the presence of such a component, i.e., that in storage, the composition does not change or only changes slightly in its properties, for example, the application and curing properties. The effect of this can be that reactions leading to the chemical curing of the described composition, for example, the silane groups, do not occur to a significant extent during storage. It can therefore be advantageous that the above-mentioned components contain no water or at most traces of water or release it during storage. Therefore, it may be useful to dry certain components chemically or physically before mixing them into the composition.

In its initial state, i.e., before the cross-linking process is implemented, an exemplary composition can have a viscosity of 500 to 20,000 mPa·s, measured according to DIN 53018 at a temperature of 20° C. The viscosity is measured at shear rates of $10\ s^{-1}$ and $100\ s^{-1}$. For example, an exemplary composition has a viscosity of 2,000 to 15,000 mPa·s, for example, 4,000 to 10,000 mPa·s. For example, an exemplary composition can have the indicated viscosities at a shear rate of $10\ s^{-1}$.

The above-described composition can be produced and stored under moisture-free conditions. For example, the composition can have a long shelf life, i.e., it can be stored under moisture-free conditions over a period of several months to a year or more in a suitable package or arrangement, such as, for example, a drum, a bag, or a cartridge, without being changed in its application properties or in its properties after curing to an extent relevant for its use.

In the application of the described composition on a substrate, the silane groups of the polymer can come into contact with moisture. The silane groups have the property of hydrolyzing upon contact with moisture. In this case, organosilanols and, by subsequent condensation reactions, organosiloxanes can be formed. As a result of these reactions, which can be accelerated by the use of catalysts, the composition can finally cure. This process is also referred to as cross-linking.

The water used or required for the curing can either originate from the air (atmospheric humidity) or else the previously-described composition can be brought into contact with a water-containing component, for example by smearing, for example with a smoothing agent, or by spraying, or a water-containing component can be added to the composition in the application, for example in the form of a water-containing paste, which, for example, is mixed in by hand or via a static mixer. In the curing by means of atmospheric humidity, the composition can cure from the outside to the inside. The speed of curing can be determined by various factors in this case, such as, for example, the diffusion rate of the water, the temperature and the environmental moisture, and it can slow down generally with the progression of the curing.

In addition, disclosed is the use of a previously described composition as a film that can be applied as a fluid, for example, for sealing structures.

The sealing of a structure with an exemplary composition can be carried out to protect against meteorological effects such as rain, snow, hail or wind, against environmental effects such as cold, heat, solar radiation or water from floods, against effects from the ground such as moisture, plant growth or root penetration, but also against effects that are caused by humans and animals, for example fire. Of course, such a seal can protect not only against the penetration of undesirable or disadvantageous effects in a structure, but also against the outflow of such to the outside. For example, this can be the case in factory buildings of the industry, where it is desirable that substances that are handled do not escape into the environment.

Structures can include in the broader sense: structures above and below ground, for example buildings, roofs, balconies, terraces, interior walls, floors, decks, outside walls, foundations, plumbing units, passageways, bridges, skywalks, streets, tracks, tunnels, mining galleries, etc.

In addition, disclosed is a method for the production of a film for sealing a substrate that comprises the steps i) preparation of a composition according to the preceding description;

ii) application of the composition in the fluid state to the substrate to be sealed;

iii) curing of the applied composition by means of moisture for forming a film.

In the application of an exemplary composition, the latter is applied on the substrate, for example, using a roller, a paintbrush, a knife, a disk, a coating knife, a rubber slide, or by means of a spraying device, for example, by means of an airless spraying device.

Suitable substrates can include, for example, concrete, mortar, brick, adobe, gypsum, a natural stone such as granite or marble, glass, glass ceramic, metal or metal alloy, wood, plastic, and paint. In addition, suitable substrates can include, for example, insulating materials, as they are often used on roofs, for example, glass wool, rock wool, styrofoam, bituminous materials, PVC or SPO membranes (SPO: flexible polyolefins).

An exemplary composition can be applied in one layer or multiple layers. For example, the composition can be applied in multiple layers. If the composition is applied in multiple layers, the application of the second layer can be done immediately after the application of the first layer or just after partial or complete curing of the first layer. The same can apply for possible other layers.

In addition, in a method for producing a film, an additional large-area material can be used on and/or under a layer of the composition and/or between layers of the composition in the case of a multi-layer application.

In this case, this large-area material can itself be a film, for example made of a plastic such as PVC or the like. In addition, the large-area material can be a fiber material, such as, for example, those from high-strength fibers such as glass fibers, carbon fibers, metal fibers and ceramic fibers, or a fiber material made of polymer fibers, such as, for example, made of textile fibers. A non-woven fabric can be used as a fiber material.

In addition, the disclosure relates to a film that can be obtained from a previously-described method by the reaction of an exemplary composition with water, for example, in the form of atmospheric humidity.

EXAMPLES

Exemplary embodiments are disclosed below. The disclosure is not limited to these exemplary embodiments that are described.

Test Method

The viscosity was determined according to DIN 53018 at a temperature of 20° C. and shear rates of $10\ s^{-1}$ and $100\ s^{-1}$. Compositions that have viscosities of <500 mPa·s or >20,000 mPa·s are considered to be less desirable or unsuitable for the production of liquid membranes.

The tensile strength and the elongation at break were determined according to DIN EN 53504 (traction speed: 100 mm/min) on films with a layer thickness of 1 mm cured for 7 days at 23° C. (room temperature "RT") and 50% relative atmospheric humidity.

The Shore A hardness was determined according to DIN 53505.

The flammability properties were determined by a test piece measuring 15×40×1 mm in a sheet cover being exposed to a Bunsen burner flame in each case for 10 seconds. Test pieces that did not burn after flame exposure were exposed to the Bunsen burner flame for another 10 seconds. The test was continued until the sample did not burn further without Bunsen burner flame exposure but no more than five times. Between flame exposures, the samples were removed from the flame for 10 seconds in each case and left in the air. For analysis, the number of flame exposure cycles until inflammation occurred was determined. In addition, the flammability behavior was determined qualitatively. The assessment of the test results was carried out as follows:

Negative ("−"):
Sample burned further after two cycles; or
Sample is not self-extinguishing, i.e., it burns up.
Positive ("+"):
Sample burns up at the earliest after three cycles; and
Sample is self-extinguishing.
Very Positive ("++"):
Sample does not burn up or burns up only after five cycles; and
Sample is self-extinguishing.

Compositions that were rated as negative are considered to be less desirable or not preferred for the production of liquid membranes.

The adhesion was measured by the non-woven fabric, which was placed in the coating, being removed by hand from the substrate in the test pieces that are produced. Coatings in which adhesion was rated negatively could be removed from the substrates without effort and exhibited a clean adhesion break over the entire surface. In the coatings with a positive adhesion rating, it took a certain amount of energy to remove the non-woven fabric from the substrate. In this case, a cohesion break developed in the coating under the non-woven fabric.

Production of the Silane-Functional Polyurethane Polymer P1

Under nitrogen atmosphere, 1,000 g of Polyol Acclaim® 12200 (Bayer MaterialScience AG, Germany; low monol polyoxypropylenediol; OH number 11.0 mg of KOH/g; water content approximately 0.02% by weight), 45.88 g of isophorone diisocyanate (IPDI; Vestanat® IPDI, Evonik Degussa GmbH, Germany), 122 g of 2,2,4-trimethyl-1,3-pentanediol diisobutyrate (Eastman TXIB, Eastman Chemical Company, USA) and 0.14 g of di-n-butyltin dilaurate (Metatin® K 712, Acima AG, Switzerland) were heated to 90° C. while being stirred continuously and were left at this temperature. After one hour of reaction time, a content of free isocyanate groups of 0.7% by weight was reached by means of titration. Then, 66.27 g of N-(3-trimethoxysilyl-propyl)-amino-succinic acid-diethyl ester was added to the reaction mixture, and stirring was continued for another 2 to 3 hours at 90° C. until no more free isocyanate could be detected by means of IR spectroscopy (2275-2230 cm$^{-1}$). The product was cooled to room temperature (23° C.) and stored under moisture-free conditions (theoretical polymer content=90.0%).

N-(3-Trimethoxysilyl-propyl)-amino-succinic acid-diethyl ester was produced as follows: 51.0 g of 3-aminopropyl-trimethoxysilane (Silquest® A-1110, Momentive Performance Materials Inc., USA) was introduced. While being stirred, 49.0 g of maleic acid-diethyl ester (Fluka Chemie GmbH, Switzerland) was slowly added at room temperature, and the mixture was stirred for 2 hours at room temperature.

Production of the Coating Formulations/to 3 and Ref1 to Ref4

According to the proportions by weight indicated in Table 1, the silane-functional polyurethane polymer P1, tris(2-ethylhexyl)phosphate (Disflamoll® TOF), 2,2,4-trimethyl-1,3-pentanediol diisobutyrate and trimethoxyvinylsilane (Silquest® A-171, Momentive Performance Materials Inc., USA) were added into a 1 l metal vessel while being stirred. Then, the aluminum hydroxide (ATH; Apyral® 16, Nabaltec AG, Germany) was dispersed until the temperature was increased to 50° C. Then, 3-(2-aminoethyl)aminopropyltrimethoxysilane (Silquest® A-1120, Momentive Performance Materials Inc., USA) and di-n-butyltin dilaurate (DBTL, Metatin® K 712, Acima AG, Switzerland) were added. Then, the mixture was stirred for 5 minutes under vacuum. The finished product was stored under moisture-free conditions.

Production of the Test Pieces

In each case, 100 g of the coating formulation was added to a 23×30 cm mold and was cured at 23° C. and 50% relative atmospheric humidity for 7 days.

TABLE 1

Compositions 1 to 3 and Reference Examples Ref1 to Ref4 as well as Results

|  | 1 | 2 | 3 | Ref1 | Ref2 | Ref3 | Ref4 |
|---|---|---|---|---|---|---|---|
| P1 | 28 | 28 | 25 | 37.4 | 37.5 | 37.4 | 28 |
| Disflamoll ® TOF | 10 | 10 | 25.54 | 10 |  |  | 10 |
| TXIB | 9.9 | 9.9 |  |  | 9.9 |  | 9.9 |
| Silquest ® A-171 | 1.8 | 1.8 | 1.8 | 1.8 | 1.8 | 1.8 | 1.8 |
| Apyral ® 16 | 43.34 | 48.64 | 41 | 43.34 | 43.34 | 53.34 |  |
| Chalk | 5.3 |  | 5 | 5.3 | 5.3 | 5.3 | 47.64 |
| Silquest ® A-1120 | 1.6 | 1.6 | 1.6 | 2.1 | 2.1 | 2.1 | 1.6 |
| DBTL | 0.06 | 0.06 | 0.06 | 0.06 | 0.06 | 0.06 | 0.06 |
| Viscosity [Pa · s] Shear Rate 10 s$^{-1}$ | 13 | 12 | 6 | 43 | 46 | 265 | 76 |
| Viscosity [Pa · s] Shear Rate 100 s$^{-1}$ | 11 | 11 | 5 | 36 | 38 | n.d. | 13 |
| Tensile Strength [MPa] | 2.3 | 3.3 | 2.6 | 3.4 | 3.8 | 5.7 | 3.1 |
| Elongation at Break [%] | 111 | 143 | 155 | 114 | 120 | 94 | 196 |

TABLE 1-continued

Compositions 1 to 3 and Reference Examples Ref1 to Ref4 as well as Results

| | 1 | 2 | 3 | Ref1 | Ref2 | Ref3 | Ref4 |
|---|---|---|---|---|---|---|---|
| Shore A | 46 | 40 | 31 | 50 | 53 | 70 | 50 |
| Flammability Properties | + | + | ++ | + | − | + | − | n.d.: Cannot be determined.

Production of Coating Formulations 4 as Well as Ref5 to Ref8

The coating formulations 4 as well as Ref5 to Ref8 were produced according to the parts by weight indicated in Table 2 in an analogous way to the previously described coating formulations.

Production of the Test Pieces

Coating formulation was applied and uniformly distributed in each case in an amount of 1 kg/m² on the different substrates according to Table 2, which were previously degreased with ethanol. Then, a non-woven fabric (Sikalastic® 120 fabric (100% Polyester Cross; 120 g/cm²), available from Sika Deutschland GmbH), was embedded in the coating and covered again in each case with coating formulation in an amount of 1 kg/m². The substrates were cured at 23° C. and 50% relative atmospheric humidity for 7 days.

TABLE 2

Composition 4 and Reference Examples Ref5 to Ref8 as well as Results

| | 4 | Ref5 | Ref6 | Ref7 | Ref8 |
|---|---|---|---|---|---|
| P1 | 27 | | | | |
| Desmodur ® XP2599 [a] | | 27 | 27 | 27 | 27 |
| Disflamoll ® TOF | 10 | 10 | 10 | 10 | 10 |
| TXIB | 9.9 | 9.9 | 9.9 | 9.9 | 9.9 |
| Silquest ® A-171 | 1.8 | | | | |
| Silquest ® A-1120 | 1.6 | | 1.6 | | |
| Silquest ® A-178 | | | | 1.6 | 0.3 |
| Apyral ® 16 | 47.64 | 47.64 | 47.64 | 47.64 | 47.64 |
| DBTL | 0.06 | 0.06 | 0.06 | 0.06 | 0.06 |
| Incozol ® HP [b] | | 4.36 | 4.36 | 4.36 | 4.36 |
| Adhesion to: | | | | | |
| Aluminum | Yes | No | n.d. | No | No |
| Steel | Yes | No | n.d. | No | No |
| Galvanized Steel | Yes | No | n.d. | No | No |
| Copper | Yes | No | n.d. | No | No |
| Glass | Yes | No | n.d. | Yes | No |

[a] NCO-Terminated Polyurethane, available from Bayer MaterialScience AG, Germany;
[b] Commercially available from Sika Schweiz AG;
n.d.: Cannot be determined;
Ref6 gelled upon the addition of Silquest ® A-1120.

It will be appreciated by those skilled in the art that the present invention can be embodied in other specific forms without departing from the spirit or characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition, comprising:
   a) at least one silane-functional polymer P having end groups of Formula (II)

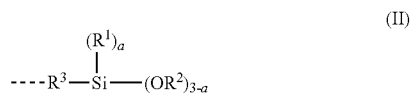

wherein
the radical $R^1$ stands for a linear or branched, monovalent hydrocarbon radical with 1 to 8 C atoms;
the radical $R^2$ stands for an acyl radical or for a linear or branched, monovalent hydrocarbon radical with 1 to 5 C atoms;
the radical $R^3$ stands for a linear or branched, divalent hydrocarbon radical with 1 to 12 C atoms, which optionally has cyclic and/or aromatic portions; and
a stands for a value of 0 or 1 or 2; and
b) 20 to 60% by weight of aluminum hydroxide, magnesium hydroxide or a mixture thereof;
wherein the composition has a viscosity of 500 to 20,000 mPa·s that is measured according to DIN 53018 at a temperature of 20° C.,
wherein the composition further comprises at least one phosphorus compound of Formula (I)

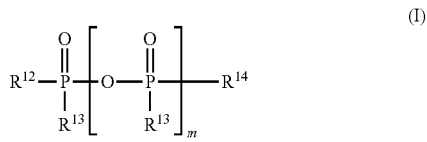

wherein either
the radical $R^{12}$ stands for a radical of Formula $-OR^{15}$;
the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;
the radical $R^{13}$ stands for a hydrogen atom or for a radical $R^{14}$;
the radical $R^{14}$ stands for a radical of Formula $-OR^{16}$;
the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and
the index m stands for a value of 0, 1 or 2;
or
each of radicals $R^{12}$, $R^{13}$ and $R^{14}$ stands for a radical of Formula $-O^-NH_4^+$;
and the index m stands for a value of 0 to 1,000,
wherein the proportion of the phosphorus compound of Formula (I) is 5 to 50% by weight of the entire composition.

2. The composition according to claim 1, wherein the radicals $R^{12}$, $R^{13}$ and $R^{14}$ in each case stand for a linear or branched, monovalent hydrocarbon radical with 1 to 18 C atoms, and m stands for a value of 0.

3. The composition according to claim 1, further comprising at least one organosilane comprising an organic radical having at least one functional group.

4. The composition according to claim 1, wherein the composition has a viscosity of 2,000 to 15,000 mPa·s measured according to DIN 53018 at a temperature of 20° C.

5. A method of applying a film, comprising applying the composition of claim 1 in fluid form to a substrate.

6. The method of claim 5, wherein the substrate is a structure, and the composition is for sealing the structure.

7. A method for the production of a film for sealing a substrate, the method comprising:
   i) providing a composition according to claim 1;
   ii) applying the composition in a fluid state to the substrate to be sealed;
   iii) curing of the applied composition by means of moisture to form a film.

8. The method according to claim 7, wherein the composition is applied to the substrate using a roller, a paintbrush, a knife, a disk, a coating knife, a rubber slide, or a spraying device.

9. A method for the production of a film for sealing a substrate, the method comprising:
   i) providing a composition comprising:
      a) at least one silane-functional polymer P having end groups of Formula (II)

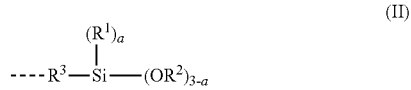
(II)

wherein
      the radical $R^1$ stands for a linear or branched, monovalent hydrocarbon radical with 1 to 8 C atoms;
      the radical $R^2$ stands for an acyl radical or for a linear or branched, monovalent hydrocarbon radical with 1 to 5 C atoms;
      the radical $R^3$ stands for a linear or branched, divalent hydrocarbon radical with 1 to 12 C atoms, which optionally has cyclic and/or aromatic portions; and
      a stands for a value of 0 or 1 or 2; and
   b) 20 to 60% by weight of aluminum hydroxide, magnesium hydroxide or a mixture thereof;
   wherein the composition has a viscosity of 500 to 20,000 mPa·s that is measured according to DIN 53018 at a temperature of 20° C.,
   ii) applying the composition in a fluid state to the substrate to be sealed;
   iii) curing of the applied composition by means of moisture to form a film,
   wherein the composition is applied in multiple layers.

10. A method for the production of a film for sealing a substrate, the method comprising:
    i) providing a composition comprising:
       a) at least one silane-functional polymer P having end groups of Formula (II)

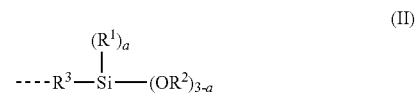
(II)

wherein
      the radical $R^1$ stands for a linear or branched, monovalent hydrocarbon radical with 1 to 8 C atoms;
      the radical $R^2$ stands for an acyl radical or for a linear or branched, monovalent hydrocarbon radical with 1 to 5 C atoms;
      the radical $R^3$ stands for a linear or branched, divalent hydrocarbon radical with 1 to 12 C atoms, which optionally has cyclic and/or aromatic portions; and
      a stands for a value of 0 or 1 or 2; and
   b) 20 to 60% by weight of aluminum hydroxide, magnesium hydroxide or a mixture thereof;
   wherein the composition has a viscosity of 500 to 20,000 mPa·s that is measured according to DIN 53018 at a temperature of 20° C.,
   ii) applying the composition in a fluid state to the substrate to be sealed;
   iii) curing of the applied composition by means of moisture to form a film,
   wherein a material is disposed on and/or under a layer of the composition and/or between layers of the composition in the case of a multi-layer application.

11. A film formed from the method according to claim 7.

12. The composition according to claim 1, wherein the radicals $R^{12}$, $R^{13}$ and $R^{14}$ in each case stand for a linear or branched, monovalent hydrocarbon radical with 4 to 16 C atoms.

13. The composition according to claim 1, wherein the radicals $R^{12}$, $R^{13}$ and $R^{14}$ in each case stand for a linear or branched, monovalent hydrocarbon radical with 6 to 12 C atoms.

14. The composition according to claim 1, wherein the proportion of phosphorus compound of Formula (I) is 5 to 30% by weight of the entire composition.

15. The composition according to claim 1, wherein the proportion of phosphorus compound of Formula (I) is 7 to 15% by weight of the entire composition.

16. The composition according to claim 3, wherein the at least one organosilane is an amino-functional organosilane.

17. The composition according to claim 1, wherein the composition has a viscosity of 4,000 to 10,000 mPa·s, measured according to DIN 53018 at a temperature of 20° C.

18. The composition according to claim 1, wherein in Formula (II), the radical $R^1$ stands for a methyl group or for an ethyl group.

19. The composition according to claim 1, wherein in Formula (II), the radical $R^2$ stands for a methyl group or for an ethyl group or for an isopropyl group.

20. The composition according to claim 1, wherein in Formula (II), a stands for a value of 0.

21. A method for the production of a film for sealing a substrate, the method comprising:
    i) providing a composition comprising:
       a) at least one silane-functional polymer P having end groups of Formula (II)

$$\text{----R}^3\text{---}\underset{\underset{(OR^2)_{3-a}}{|}}{\overset{\overset{(R^1)_a}{|}}{Si}}\text{---}(OR^2)_{3-a} \quad (II)$$

wherein
the radical $R^1$ stands for a linear or branched, monovalent hydrocarbon radical with 1 to 8 C atoms;
the radical $R^2$ stands for an acyl radical or for a linear or branched, monovalent hydrocarbon radical with 1 to 5 C atoms;
the radical $R^3$ stands for a linear or branched, divalent hydrocarbon radical with 1 to 12 C atoms, which optionally has cyclic and/or aromatic portions; and
a stands for a value of 0 or 1 or 2; and
b) 20 to 60% by weight of aluminum hydroxide, magnesium hydroxide or a mixture thereof;
wherein the composition has a viscosity of 500 to 20,000 mPa·s that is measured according to DIN 53018 at a temperature of 20° C.,
ii) applying the composition in a fluid state to the substrate to be sealed;
iii) curing of the applied composition by means of moisture to form a film,
wherein the composition is applied to the substrate using an airless spraying device.

22. The method according to claim 10, wherein the material is a fiber material.

23. The method according to claim 10, wherein the material is a non-woven fabric.

24. The composition according to claim 1, wherein the silane-functional polymer P includes at least one of:
a silane-functional polyurethane polymer P1 which is obtained by a reaction of a silane which has at least one group that is reactive to isocyanate groups, with a polyurethane polymer which has isocyanate groups,
a silane-functional polyurethane polymer P2 which is obtained by a reaction of an isocyanatosilane IS, with a polymer which has functional end groups which are reactive to isocyanate groups, and
a silane-functional polymer P3 which is obtained by a hydrosilylation reaction of polymers with terminal double bonds.

25. The composition according to claim 1, wherein the silane-functional polymer P is a polyurethane polymer, a poly(meth)acrylate polymer or a polyether polymer.

26. The composition according to claim 1, wherein the composition has a viscosity of 500 to 10,000 mPa·s, measured according to DIN 53018 at a temperature of 20° C.

27. The method according to claim 9, wherein the composition further comprises at least one phosphorus compound of Formula (I)

$$R^{12}-\underset{\underset{R^{13}}{|}}{\overset{\overset{O}{\|}}{P}}-\left[O-\underset{\underset{R^{13}}{|}}{\overset{\overset{O}{\|}}{P}}\right]_m-R^{14} \quad (I)$$

wherein either
the radical $R^{12}$ stands for a radical of Formula $-OR^{15}$;
the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;
the radical $R^{13}$ stands for a hydrogen atom or for a radical $R^{14}$;
the radical $R^{14}$ stands for a radical of Formula $-OR^{16}$;
the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and
the index m stands for a value of 0, 1 or 2;
or
each of radicals $R^{12}$, $R^{13}$ and $R^{14}$ stands for a radical of Formula $-O^-NH_4^+$;
and the index m stands for a value of 0 to 1,000.

28. The method according to claim 10, wherein the composition further comprises at least one phosphorus compound of Formula (I)

$$R^{12}-\underset{\underset{R^{13}}{|}}{\overset{\overset{O}{\|}}{P}}-\left[O-\underset{\underset{R^{13}}{|}}{\overset{\overset{O}{\|}}{P}}\right]_m-R^{14} \quad (I)$$

wherein either
the radical $R^{12}$ stands for a radical of Formula $-OR^{15}$;
the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;
the radical $R^{13}$ stands for a hydrogen atom or for a radical $R^{14}$;
the radical $R^{14}$ stands for a radical of Formula $-OR^{16}$;
the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and
the index m stands for a value of 0, 1 or 2;
or
each of radicals $R^{12}$, $R^{13}$ and $R^{14}$ stands for a radical of Formula $-O^-NH_4^+$;
and the index m stands for a value of 0 to 1,000.

29. The method according to claim 21, wherein the composition further comprises at least one phosphorus compound of Formula (I)

$$R^{12}-\underset{\underset{R^{13}}{|}}{\overset{\overset{O}{\|}}{P}}-\left[O-\underset{\underset{R^{13}}{|}}{\overset{\overset{O}{\|}}{P}}\right]_m-R^{14} \quad (I)$$

wherein either
the radical $R^{12}$ stands for a radical of Formula $-OR^{15}$;
the radical $R^{15}$ stands for a linear or branched, monovalent hydrocarbon radical with 1 to 18 C atoms, which optionally has one or more heteroatoms, and optionally one or more C—C multiple bonds and/or optionally cycloaliphatic and/or aromatic portions;

the radical $R^{13}$ stands for a hydrogen atom or for a radical $R^{14}$;

the radical $R^{14}$ stands for a radical of Formula $-OR^{16}$;

the radical $R^{16}$ stands for a hydrogen atom or for a linear or branched, monovalent hydrocarbon radical with 1 to 18 C atoms, which optionally has one or more heteroatoms, and optionally one or more C—C multiple bonds and/or optionally cycloaliphatic and/or aromatic portions; and the index m stands for a value of 0, 1 or 2;

or each of radicals $R^{12}$, $R^{13}$ and $R^{14}$ stands for a radical of Formula $-O^-NH_4^+$;

and the index m stands for a value of 0 to 1,000.

30. The method according to claim 27, wherein the proportion of phosphorus compound of Formula (I) is 7 to 15% by weight of the entire composition.

31. The method according to claim 28, wherein the proportion of phosphorus compound of Formula (I) is 7 to 15% by weight of the entire composition.

32. The method according to claim 29, wherein the proportion of phosphorus compound of Formula (I) is 7 to 15% by weight of the entire composition.

* * * * *